INVENTOR.
ROBERT H. JENKINS
BY
Carl V. Olson
ATTORNEY

INVENTOR.
ROBERT H. JENKINS
BY
Carl V. Olson
ATTORNEY 3,237,176

BINARY RECORDING SYSTEM

Robert H. Jenkins, Audubon, N.J., assignor to Radio Corporation of America, a corporation of Delaware Filed Jan. 26, 1962, Ser. No. 168,965
4 Claims. (Cl. 340—174.1)

Figure 1:
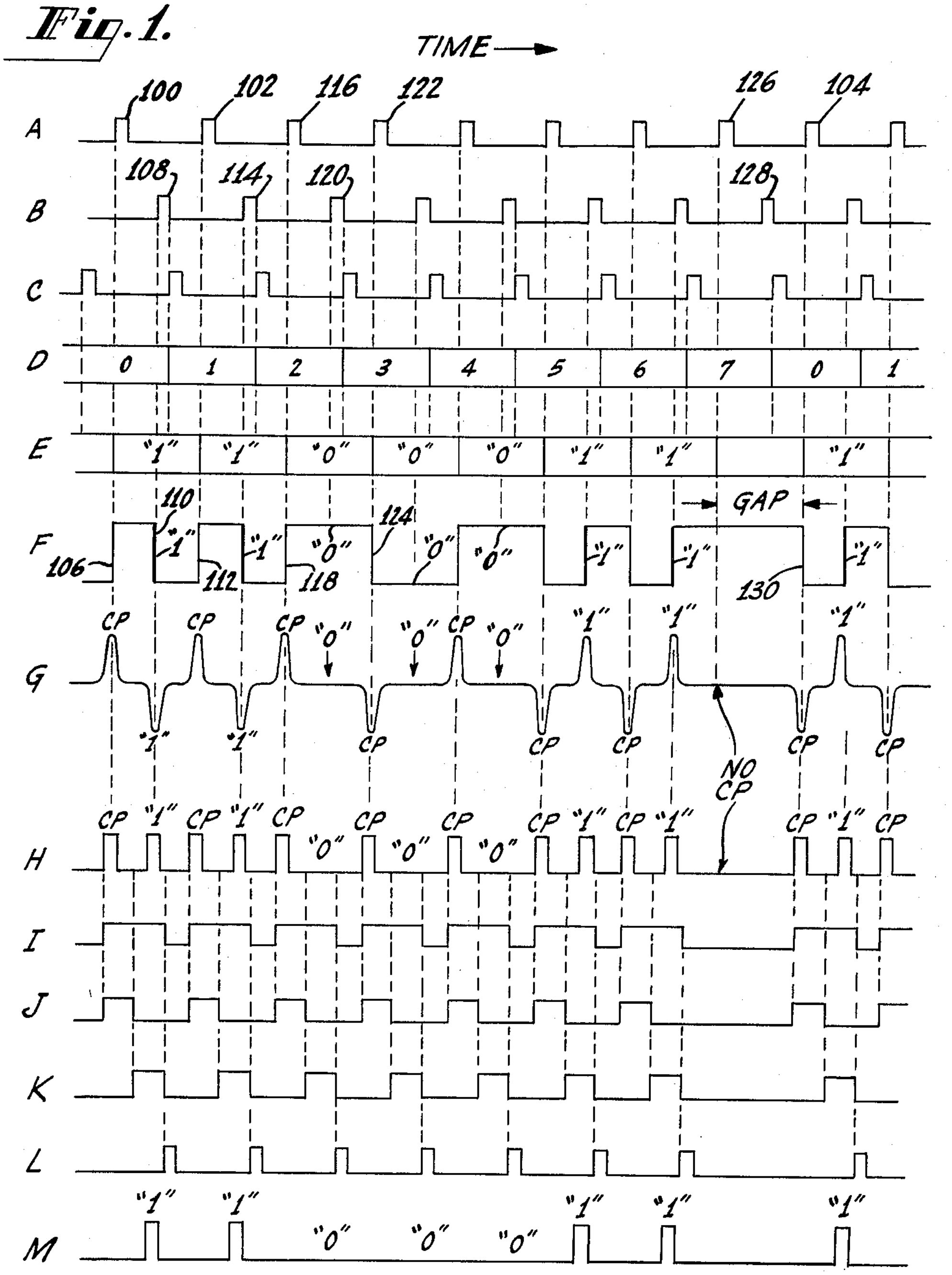

This invention relates to improved systems for recording and reproducing pulse-type information on recording media such as magnetic tape, magnetic discs, or magnetic drums. While not limited thereto, the invention is particularly useful as applied to binary digital data processing apparatus.

Various techniques have heretofore been suggested for recording and reproducing pulse-type information on magnetic media. The prior art arrangements include systems known as the return-to-zero system, the bipolar return-to-zero system, the double pulse return-to-zero system, the non-return-to-zero system, the bipolar non-return-to-zero system, the modified non-return-to-zero system and the phase modulated non-return-to-zero system. These several prior art systems are characterized in having relative advantages and disadvantages in comparison with one another. However, all the prior art arrangements have one disadvantage or another which it is desirable to avoid.

It is therefore a general object of this invention to provide an improved non-return-to-zero system for recording and reproducing pulse-type information which is characterized in being relatively efficient and free of disadvantages found in prior art arrangements.

It is another object to provide an improved recording and reproducing system wherein the recording of binary information is intimately and economically accompanied by the recording of timing or clocking information.

It is a further object to provide an improved recording and reproducing system wherein characters, each including a plurality of binary bits, are recorded in such a way that a malfunctioning or "drop-out" during the reproducing of one character does not affect the synchronization and reproduction of succeeding characters.

It is yet another object to provide an improved system which is reliable and economical in permitting a high packing density of digital information on a magnetic recording medium.

It is a still further object to provide a recording and reproducing system affording a simple and effective scheme for parity checking.

Briefly, the non-return-to-zero recording and reproducing system according to the invention is one wherein the recording medium is provided with a transition at the time of each clock pulse, and also at the time of each interposed information binary bit provided that it is a "1" bit. It will be understood that the designation of one of the two possible binary information bits as a "1" is purely arbitrary, and that the transition can be made to correspond with a "0" bit rather than a "1" bit. The successive recording transitions are each of reversed polarity compared with the immediately preceding transition. Stated another way, alternate ones of the transitions are positive going and intermediate ones are negative going. Or, stated yet another way, each successive transition has the opposite phase as compared with the preceding transition.

According to a feature of the invention, an information character consists of a predetermined number of information bits, and each recorded information character is separated in time from the next following character by a time or space gap. Therefore, some recorded clock pulses are positive-going transitions and others are negative-going transitions. Similarly, some recorded "1" information bits are positive-going transitions and others are negative-going transitions. Means are provided when reproducing the recorded information to sense the inter-character gap and thereby control the reading out of the information bits of the next following character. Gap detector means are used to establish clock synchronization at the beginning of the reading of each recorded character regardless of malfunctioning or "drop-out" during the reading of the preceding character.

Figure 2:
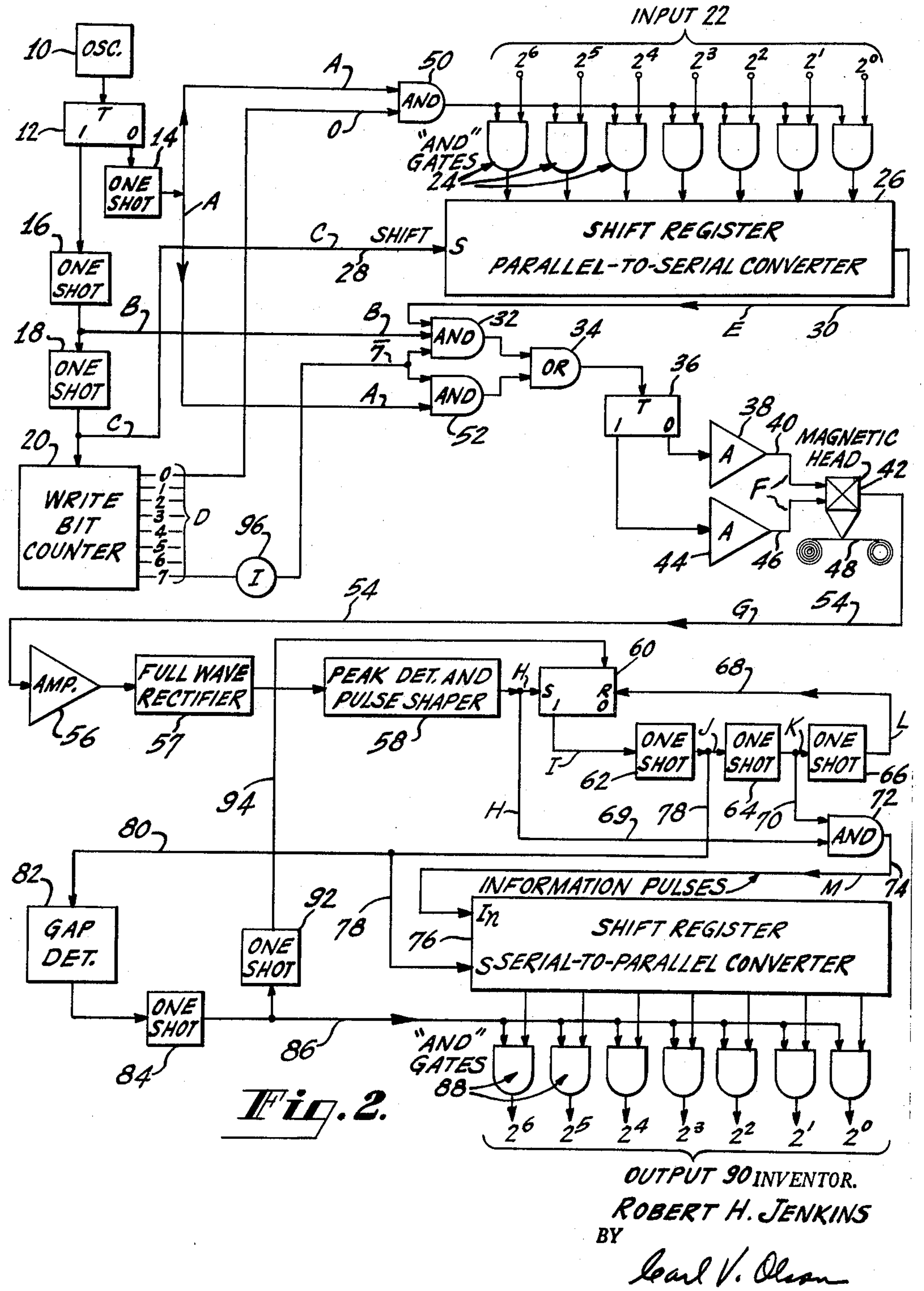

These and other objects and aspects of the invention will be apparent to those skilled in the art from the following more detailed description taken in conjunction with the appended drawings, wherein:

FIGURE 1 is a chart of waveforms, somewhat idealized, which will be referred to in describing the operation of the binary digital recording and reproducing system shown in FIGURE 2; and FIGURE 2 is a block diagram of an example of a recording and reproducing system constructed according to the teachings of this invention.

The various units or blocks in the system of the invention may be of any suitable conventional type. Suitable circuits for use as the gates, flip-flops, registers, etc., are well known to those skilled in the art.

DESCRIPTION OF RECORDING APPARATUS

FIGURE 1 shows waveforms A through M occurring at correspondingly designated points in the recording and reproducing apparatus of FIGURE 2. The timing waveforms A, B, C and D of FIGURE 1 are generated, in a conventional manner, by an oscillator 10, a triggerable flip-flop 12, one-shot multivibrators 14, 16 and 18 and a counter 20 capable of counting one more than the number of bits in each character to be recorded. In the present example, each character includes seven bits each of which represents a "1" or a "0." The characters are separated in time by an inter-character gap equal to the time period between information bits.

The seven information bits of a character to be recorded are simultaneously applied on separate leads to the seven input terminals 22, labeled $2^0$ through $2^6$, and thence to seven respective "and" gates 24. The outputs of the "and" gates are connected to a shift register or parallel-to-serial converter 26. The converter 26 also has a shift input terminal S receptive on line 28 to a shift signal which causes the binary bits applied in parallel at the inputs of the converter to be delivered out in serial form on the single output lead 30. The serially arranged information bits on lead 30 are applied through an "and" gate 32, and an "or" gate 34 to the trigger input T of a triggerable flip-flop multivibrator 36. The "0" output of the flip-flop 36 is coupled through an amplifier 38 and a lead 40 to one end of the coil (not shown) of a magnetic recording and reproducing head or transducer 42. The "1" output of the flip-flop 36 is coupled through an amplifier 44 and a lead 46 to the other end of the coil of the magnetic head or transducer 42. Magnetic recording media 48, such as magnetic tape, is arranged to move relative to the transducer 42. Two additional "and" gates 50 and 52 are provided to control sequences of operation as will be described later. The portion of the apparatus thus far described is employed in recording binary digital information on the recording medium 48.

DESCRIPTION OF REPRODUCING APPARATUS

The portion of the apparatus of FIGURE 2 which is used for reproducing information recorded on the recording medium 48 will now be described. The magnetic head or transducer 42 includes output leads 54 which carry an electrical signal corresponding with the information previously recorded on the recording medium 48. A separate reading head may be used, if desired. The output on lead 54 is applied through an amplifier 56 and a full wave rectifier 57 to a peak detector and pulse shaper circuit 58. The peak detector and pulse shaper circuit 58 may be any suitable known circuit of the type which generates a shaped output pulse accurately related in time with the peak of a received pulse. A threshold circuit followed by an amplifier may be employed. Alternatively, an improved circuit described in my copending application Serial No. 76,249, filed on December 16, 1960, now Patent No. 3,048,717, and entitled "Peak Time Detecting Circuit," may be used.

The output of the peak detector and pulse shaper circuit 58 is applied to the set input S of a bistable multivibrator 60. The "1" output of the bistable multivibrator 60 is applied through three monostable or one-shot multivibrators 62, 64 and 66, the output of the one-shot 66 being returned over lead 68 to the reset input R of the multivibrator 60. The output of the peak detector and pulse shaper 58 on lead 69 and the output of the one-shot 64 on lead 70 are applied to an "and" gate 72 having an output lead 74 connected to the information input I*n* of a shift register or serial-to-parallel converter 76. The output of the one-shot 62 on lead 78 is applied to the shift input S of the converter 76 and also, over lead 80, to the input of a gap detector circuit 82.

The gap detector 82 may be any suitable known circuit of the type which provides an output pulse after a predetermined time interval following receipt of an input pulse, provided that no additional input pulse is received during the predetermined time interval. A suitable circuit consists of a monostable multivibrator which remains in its unstable state for a predetermined period of time longer than the period between repetitive input pulses. If an input pulse is not received during the predetermined period of time, the multivibrator returns to its stable state and provides an output indicating the absence of an input pulse. The monostable multivibrator may be constructed of a flip-flop (bistable multivibrator) having a time delay circuit connected between an output of the flip-flop and the reset input of the flip-flop. An improved time delay circuit is described in my copending patent application Serial No. 109,154, filed May 10, 1961, now Patent No. 3,073,972, and entitled "Timing Circuits." The output of the timing circuit may be applied through a trigger circuit as described in my copending patent application Serial No. 138,400, filed September 15, 1961, and entitled "Trigger Circuits."

The output of the gap detector 82 is applied to a one-shot multivibrator 84 having an output on lead 86 going to inputs of seven output "and" gates 88. The seven outputs of the converter 76 are also coupled to respective ones of the "and" gates 88. The outputs of the "and" gates are connected to seven output terminals 90 which are individually designated $2^0$ through $2^6$.

The output of the one-shot multivibrator 84 is also coupled to the input of a one-shot multivibrator 92 having an output on lead 94 going to the reset input R of the bistable multivibrator 60. The output of the one-shot 92 on the lead 94 may also be employed for resetting the serial-to-parallel converter 76.

OPERATION DURING RECORDING

The operation of that portion of the system of FIGURE 2 which is employed during the recording of digital information will now be described with references to the waveforms A through F of FIGURE 1. The timing system 10 through 20 provides the timing signals A through D of FIGURE 1. Clock pulse 100 of clock pulse wave A from one shot 14 occurs during the time that a O output (FIGURE 1D) appears at the output O from the write bit counter 20. These timing waves condition the "and" gate 50, which in turn enables the "and" gates 24 and thus permits the transfer of a seven-bit character from the input terminals 22 to the parallel-to-serial converter 26. The lowest order bit $2^0$ is then present on the output lead 30 of the converter 26, and the higher order bits are stored in order in the converter.

FIGURE 1E shows, by way of example, an input character 1100011 followed by a gap, which is in turn followed by the first bit of the next following character. During the interval between the clock pulses 100 and 102 of FIGURE 1A, the lowest order bit "1" of FIGURE 1E is present on the output lead 30 of the converter 26 and is thus present at one input of the "and" gate 32. The six higher order information bits of FIGURE 1A successively appear on the output lead 30 as successive shift pulses are applied to the converter 26. No further input information is accepted from the input 22 until a clock pulse 104 of FIGURE 1A occurs at a time coinciding with a O output from the counter 20.

The clock pulse 100 of FIGURE 1A is applied to the "and" gate 52 coincident with the application thereto of a "not 7" ($\bar{7}$) output from the inverter 96, which is in turn supplied from the 7 count output of the counter 20. These two signals enable the "and" gate 52 which provides an output passing through the "or" gate 34 to the trigger input T of the flip-flop 36. This causes the "0" output of the flip-flop 36 to go high, with the result that a current flows through the amplifier 38 and the lead 40 to the coil of the magnetic head 42 and cause the recording of a positive-going clock transition on the recording medium 48. The clock transition is identified as 106 in FIGURE 1F.

Thereafter, the "and" gate 32 is enabled by the "1" signal on lead 30 (FIGURE 1E), by the timing pulse 108 (FIGURE 1B) and the $\bar{7}$ from the counter 20 and inverter 96. The output of the enabled "and" gate 32 passes through the "or" gate 34 to the trigger input T of the flip-flop 36. The flip-flop 36 is triggered causing its "1" output to go high so that a current goes through the amplifier 44 and the lead 46 to the coil in the magnetic head 42. This current transition is in an opposite direction compared with the preceding transition, and it causes the negative-going information bit transition 110 (FIGURE 1F) to be recorded on the recording medium 48. This transition 110 (FIGURE 1F) represents the recording of the first information bit "1" (FIGURE 1E) of the character originally supplied to the converter 26.

Upon the occurrence of the next clock pulse 102 of FIGURE 1A, the reverse transition 112 of FIGURE 1F is recorded in like manner. Then at the occurrence of timing pulse 114 of FIGURE 1B, the next information bit "1" is in like manner recorded as another transition. Similarly, the clock pulse 116 of FIGURE 1A results in another transition 118. When the next timing pulse 120 of FIGURE 1B occurs, no transition is recorded on the recording medium 48. There is no transition at this time because it is a "0" signal on the input lead 30 of the "and" gate 32. Therefore, the "and" gate 32 is not enabled, and the flip-flop 36 is not triggered. The next time at which flip-flop 36 is triggered is at the occurrence of clock pulse 122 of FIGURE 1A at which time the "and" gate 52 is enabled to produce a clock pulse transition 124 (FIGURE 1F).

It is thus seen that the scheme of operation is one wherein every clock pulse of FIGURE 1A produces a recorded transition so long as the output of the counter 20 is $\bar{7}$, meaning not 7. Also, a transition is produced at the occurrences of the timing pulses of FIGURE 1B solely when the output on the lead 30 from the converter 26 is a "1" and the output of the counter 20 is $\bar{7}$. During the occurrence of clock pulse 126 of FIGURE 1A and timing pulse 128 of FIGURE 1B, the output of the counter 20 is 7 as shown by FIGURE 1D. When the output of counter 20 is 7, the "and" gates 32 and 53 are not enabled due to the absence of the $\bar{7}$ signal from inverter 96, and therefore transitions are not recorded on the recording medium 48. This interval, between the clock pulses 126 and 104 of FIGURE 1A, is used to provide an inter-character gap between successive recorded characters, each of which has 7 bits in the present example.

At the end of the gap as defined by the occurrence of the clock pulse 104 of FIGURE 1A, the output of the counter 20 is no longer 7, and the flip-flop 36 is triggered to provide a clock pulse transition 130 for timing the beginning of the next following character. Thereafter, the first information bit of the following character results in an information transition on the recording medium 48 if the first bit is a "1," as it is in the present example.

It is seen that an information bit occurring between clock pulses results in an information transition on the recording medium 48 solely if the information bit is a "1." There is no recorded transition if the information bit is a "0." It will also be noted that a transition corresponding to a "1" may be either positive going or negative going depending on the direction of the preceding clock pulse transition. As a corollary, the clock pulse transitions are either positive going or negative going depending on the direction of the preceding transition, which may have been either a clock pulse transition or a "1" transition. Stated another way, successive alternate ones of the transitions are positive going and intermediate ones of the transitions are negative going.

Throughout this description and the accompanying claims, an information transition on the recording medium is associated with a "1" information bit. It will be understood that the assignment at designation "1" to a transition is purely arbitrary, and that the assignment of a "0" to a transition is equally appropriate. Therefore, the designation "1" herein is intended to mean one or the other of the two possible information bits in a binary information system.

OPERATION DURING REPRODUCING

The waveform of FIGURE 1F represents the successively reversing current transitions applied to the coil of the magnetic heat 42 during the recording process. When, during reproduction of the recorded information, the magnetic head 42 passes over the recording medium 48, a voltage waveform, as represented by FIGURE 1G, is induced in the coil of head 42 and supplied to the output lead 54. The output wave of FIGURE 1G includes a pulse at each recorded transition, each pulse having a polarity determined by whether the transition is positive going or negative going. The induced wave of FIGURE 1G is applied from line 54 through amplifier 56 and full wave rectifier 57 to peak detector and pulse shaper 58 which translates the wave of FIGURE 1G to a wave as shown in FIGURE 1H. The wave of FIGURE 1H is one wherein all the pulses are of the same polarity and are suitable for application to the set input S of the flip-flop 60.

The output (FIGURE 1I) of the flip-flop 60 is applied through a series of one-shot multivibrators 62, 64 and 66 to produce the timing waveforms J, K and L of FIGURE 1. The waveform L is used merely to reset the flip-flop 60. The waveform H and the waveform K are applied to the "and" gate 72 with the result that solely the "1" information bit pulses pass through the gate and appear on lead 74 in the form shown by waveform M of FIGURE 1. These information pulses are applied to the information input I*n* of the serial-to-parallel converter 76. The waveform J from one-shot 62 is applied over lead 78 to the shift input S of the converter 76. By this arrangement, the information bits appearing serially at the information input I*n* of the converter 76 are successively shifted into the converter until the bit positions of the converter are filled and ready to be read out in parallel.

The time at which the converter 76 is filled and ready to be read out is determined by applying the waveform J of FIGURE 1 over lead 80 to the gap detector 82. The gap detector 82 senses the absence of a clock pulse, which signifies the end of a character, and provides an output through the one-shot 84 and the lead 86 to the "and" gates 88. When the "and" gates 88 are thus enabled, the contents of the converter 76 are gated out in parallel to the character output terminals 90.

The gap detector 82 also acts through the one-shot 84, the one-shot 92 and the lead 94 to reset the flip-flop 60, thus resetting the flip-flop 60 at the occurrence of each inter-character gap. The next following pulse of waveform H of FIGURE 1 applied to set input S of flip-flop 60 is known to be a clock pulse. This is because a clock pulse transition invariably follows an inter-character gap. It is also known that the first information bit, which may be a pulse or no pulse, occurs between the first and second clock pulses of each character. By this arrangement, synchronization is established by the beginning of each information character. Synchronization is established regardless of whether a malfunctioning or defect in the tape resulted in the "drop out" or loss of an information bit or clock pulse in the preceding character. Therefore, a "drop out" results in merely the loss of one character and does not affect the reproduction of succeeding characters.

The recording and reproducing system of this invention lends itself to the use of a simple one-stage counter for parity checking. A "1" results in two transitions (one clock transition and one information transition) and a "0" results in only one transition (a clock transition). Therefore an even number of "0" 's in a character always results in an even total number of transitions per character. A one-stage counter can thus respond to the wave H from the detector and shaper 58 to indicate even parity. For example, the output of "and" gate 72 may be applied to the trigger input of a triggerable flip-flop which may be reset by the output of gap detector 82. The "1" or "0" side of this flip-flop can then be monitored for parity errors. That is, the "1" output will be relatively high after each correct character.

What is claimed is:

1. A non-return-to-zero system of magnetic recording and reproducing comprising a source of a train of clock pulses including separated groups of $n$ equally spaced pulses, a source of timing pulses each delayed relative to a corresponding clock pulse, a source of serial binary information signals wherein each character includes $n$ bits each representing a "1" or a "0," a magnetic recording and reproducing transducer, gating means under the control of said pulses and operative to supply current to said transducer which reverses in direction with each successive clock pulse and coincidence of a timing pulse and solely a "1" information signal, whereby the times of said current reversals are recorded as a discontinuity on a recording medium, means coupled to said transducer when reproducing the recorded information to detect said discontinuities regardless of polarity and generate pulses corresponding thereto, a gap detector means to sense the gap between groups of pulses, whereby the next following pulse represents a clock pulse and the pulses between clock pulses each represent a recorded "1," and means under the control of said clock pulses and said gap detector for gating each pulse representing a "1" and the absence of a pulse representing a "0" to an output line.

2. A non-return-to-zero system of recording and reproducing comprising a source of a train of clock pulses included separated groups of $n$ equally spaced pulses, a source of timing pulses each delayed relative to a corresponding clock pulse, a source of serial binary information signals wherein each character includes $n$ bits each representing a "1" or a "0," a recording and reproducing transducer and recording medium, gating means under the control of said pulses and operative to supply a current transition to said transducer which reverses in direction with each successive clock pulse and coincidence of a timing pulse and a "1" information signal, whereby the times of said transitions are recorded as a discontinuity on said recording medium, means coupled to said transducer when reproducing the recorded information to detect said discontinuities regardless of polarity and generate pulses corresponding thereto, a gap detector means to sense the gap between groups of pulses, whereby the next following pulse represents a clock pulse and the pulses between clock pulses each represent a recorded "1," a serial-to-parallel converter, means under the control of said clock pulses and said gap detector for gating each pulse representing a "1" and the absence of a pulse representing a "0" to said converter, and means under the control of said gap detector for gating information signals representing characters from said converter.

3. In a non-return-to-zero system of magnetic recording and reproducing wherein the recording medium records successively opposite-going transitions representing clock pulses and binary "1" information pulses, said clock pulses occurring in groups of *n* equally spaced pulses separated by a gap, the combination of a magnetic reproducing transducer, means coupled to said transducer to detect said transitions regardless of direction and generate pulses corresponding thereto, means to sense the gap between groups of pulses, whereby the next following pulse represents a clock pulse and the pulses between clock pulses each represent a recorded "1," a serial-to-parallel converter, and means under the control of said clock pulses and said gap detector for gating each pulse representing a "1" and the absence of a pulse representing a "0" to said converter, and means under the control of said gap detector for gating information signals representing characters from said converter.

4. In a non-return-to-zero system of magnetic recording and reproducing wherein the recording medium records successively opposite-going transitions representing clock pulses and binary "1" information pulses, said clock pulses occuring in groups of *n* equally spaced pulses separated by a gap, the combination of a magnetic reproducing transducer, means coupled to said transducer to detect said transitions regardless of direction and generate pulses corresponding thereto, means to sense the gap between groups of pulses, whereby the next following pulse represents a clock pulse and the pulses between clock pulses each represent a recorded "1," a serial-to-parallel converter, and means under the control of said clock pulses and said gap detector for gating each pulse representing a "1" and the absence of a pulse representing a "0" to an output line.

References Cited by the Examiner

UNITED STATES PATENTS

| | | | |
|---|---|---|---|
| 2,807,004 | 9/1957 | Pouliart et al. | 340—174.1 |
| 3,092,814 | 6/1963 | Hoagland | 340—174.1 |

OTHER REFERENCES

Pages 72–75, October 1959, Gabor, Andrew, Electronics: "High Density Recording on Magnetic Tape."

IRVING L. SRAGOW, *Primary Examiner.*